United States Patent Office 3,522,547
Patented Aug. 4, 1970

3,522,547
TWO-STAGE ULTRASONIC TRAVELING WAVE DEVICE

Lewis T. Claiborne, Jr., Dallas, Tex., assignor to Texas Instruments Incorporated, Dallas, Tex., a corporation of Delaware Continuation-in-part of application Ser. No. 699,005, Dec. 26, 1967. This application Feb. 25, 1969, Ser. No. 802,146
Int. Cl. H03f 3/04
U.S. Cl. 330—5.5 17 Claims

ABSTRACT OF THE DISCLOSURE

Disclosed is a piezoelectric ultrasonic wave amplifier having two regions, the first region being biased to amplify an input signal and the second being formed to present dynamic electron traps to attenuate signals, noise, harmonics, and subharmonics with little or no amplification of the input signal, thereby effecting a two-stage, band-pass amplifier.

CROSS-REFERENCES TO RELATED APPLICATIONS

This application is a continuation-in-part of copending application Ser. No. 699,005, dated Dec. 26, 1967, now abandoned and entitled "Two Stage Ultrasonic Traveling Wave Device."

BACKGROUND OF THE INVENTION

Field of the invention

This invention relates to ultrasonic wave devices and more particularly to a two-stage, piezoelectric-crystal device for amplifying ultrasonic traveling acoustic waves within a selected frequency band and attenuating acoustic waves outside that band.

Description of the prior art

In an article of the Journal of Applied Physics, vol. 33 (1962), D. L. White demonstrated that when a D.C. field and an ulstrasonic plane wave are applied to a piezoelectric semiconductor crystal, an interaction occurs between the free electrons drifting in the crystal due to the applied D.C. field and the field produced in the crystal by the ultrasonic wave. If the drift velocity of the free electrons exceeds the velocity of sound in the crystal, amplification of the applied wave occurs.

One problem encountered in the construction of ultrasonic wave amplifiers is the reflections of the applied wave from the ends of the piezoelectric crystal. As discussed by J. H. Rowen et al. in their patent, No. 3,234,482, if the particular parameters of the crystal are such that the net reverse loss is less than the net forward gain, the reflections from the crystal will cause spontaneous oscillations to occur, and the device will be unstable. Rowen et al. have solved this problem by defining two regions in the crystal, the first region being biased to amplify the applied wave, and the second region having its resistivity and length adjusted to avoid undesirable round trip gain of reflections at the crystal faces to make the device stable in normal operation.

SUMMARY OF THE INVENTION

The present invention represents an improvement over the device described by Rowen et al. and, although the devices appear on first blush to be similar, they are quite different. The present invention utilizes a two stage device similar to that of Rowen et al. but with the addition into and throughout at least the second region shallow to medium acceptor impurities or other point defects which form trapping centers having relaxation rates near the frequency of the ultrasonic wave. This is in contradistinction to the Rowen et al. patent in which the possible use of doping as a means of controlling the bulk D.C. conductivity is mentioned; this is a well-known phenomena. Specific impurities are used in the instant invention to present dynamic electron traps, traps which change their trapping characteristics when a strain, such as is created by ultrasonic wave is applied to the crystal. By appropriately choosing the shallow doping impurities, the dynamic electron traps will define a relaxation time which affects the frequencies of ultrasonic waves which will be amplified and attenuated. These dynamic traps result in a definite cut-off frequency at which no amplification occurs and attenuation begins; hence, if the operating frequency is above this cut-off frequency, the amplifier will amplify the desired frequency and attenuate and suppress subharmonics and other lower frequency noise. Additionally, the naturally occurring phenomena of the crystal tend to suppress and attenuate higher frequency waves. Therefore, if the relaxation time is determined by the proper doping impurities, the device will amplify the applied signal over a desired operating band, will suppress lower frequency signals by the dynamic trapping, and will attenuate higher frequency signals by thermal energy and other naturally occurring phenomena.

Figure 1:
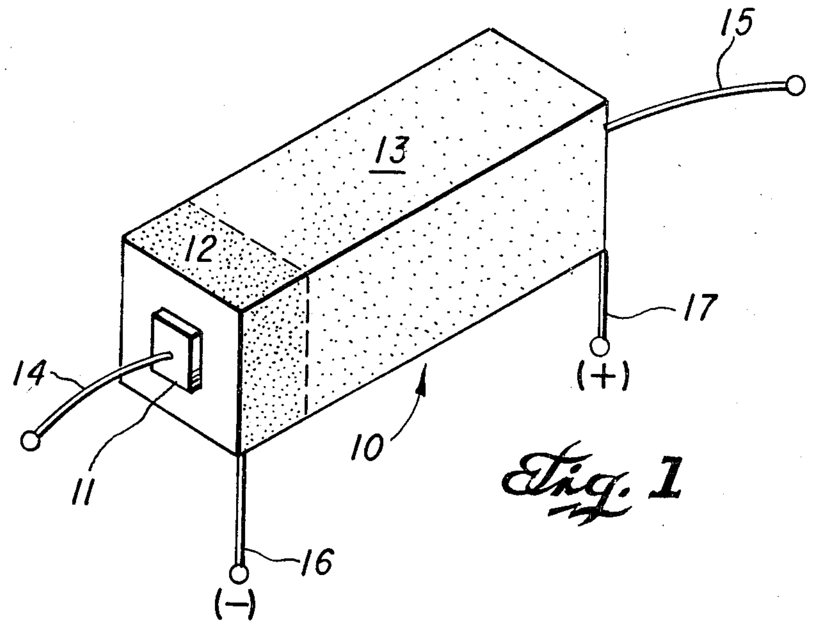
FIG. 1 is a perspective view of a two-stage traveling wave device of the invention.

The acoustic amplifier of FIG. 1 includes a single piezoelectric crystal 10 such as cadmium sulfide, CdS, with a transducer 11 at the input region 12 to convert an electrical signal applied by wire 14 into sound waves, and a similar transducer (not shown at the output region 13 to convert the output sound waves back into an electrical signal removed by wire 15. Ohmic contacts are formed on the end of the output 10 to provide a ground plane and to match the acoustic impedance of the input and output transducers to that of the crystal 10 and to enable a D.C. potential to be applied by wires 16 and 17.

Figure 2:
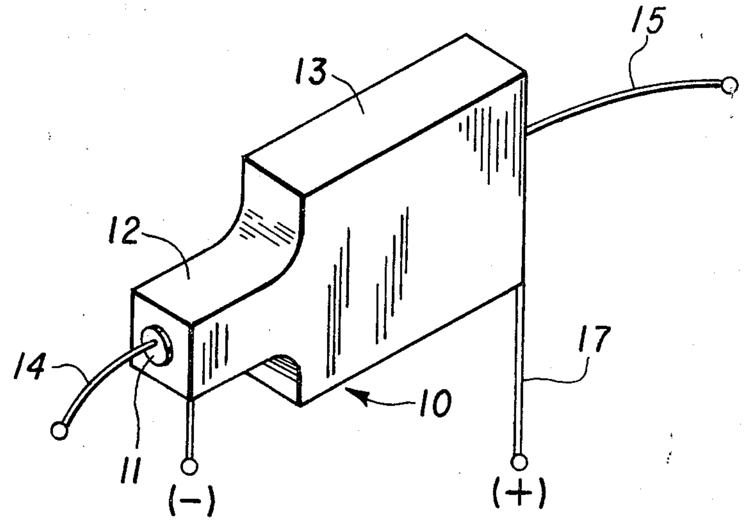
FIG. 2 is an alternate embodiment of the device of the invention.

An alternate embodiment of the amplifier is shown in FIG. 2, like reference numerals denoting the like features of FIG. 1. The configuration of regions 12 and 13 are varied, region 13 being of larger cross-sectional area than region 12. Since the electric field is proportional to the resistivity per unit area, the electric field in region 12 is greater than that in region 13. The different cross-sectional areas may be desirable when a different D.C. field is desired to be applied to region 13 than region 12, to minimize reflections from the end of the crystal and to achieve desired operating parameters, as below discussed in detail.

The crystal 10 may be of any material which exhibits acoustic amplification properties; cadmium sulfide (CdS) is a preferred material, but other group II–IV semiconductors such as ZnO, ZnS, CdSe, CdTe, and ZnTe may be used as well. Still another important group of materials which may be used are the III–IV compounds, such as GaAs, InSb, GaP, and InAs. Additionally, the cubic forms of several group II–IV compounds are also considered possible materials for the crystal 10.

In analyzing the operation of the device, each of the two stages is considered independently of the other. In the first, or input, region 12, the material parameters are adjusted to provide maximum amplification below the desired operating frequency of the acoustic wave generated by the transducer 11. The material parameters of the second, or output, region 13 are adjusted to provide high-pass filtering properties with little or no net amplification of the applied acoustic wave. Adjustment of the electrical characteristics of regions 12 and 13 can be achieved in several ways, including changing the electron drift velocity by changing the D.C. potential and conductivity of the crystal, by actually changing the value of the applied voltage, by changing the configuration of the device (as illustrated by the alternate embodiment shown in FIG. 2), by changing the illumination portion of the device if it is made of a photosensitive material, or by some other technique, and by adjusting the dynamic trapping parameters.

By application of a D.C. voltage to terminals 16 and 17 of the device of FIG. 1, an electric field is created in the crystal 10 which causes electrons to flow. When this electron flow is in the direction of propagation of an applied acoustic wave generated by the transducer 11, a traveling A.C. field is created by the interaction between the electrons and the acoustic wave. The electrons are drifted by the applied D.C. field, and the applied acoustic wave causes the space charge electrons to "bunch." As a result of the interaction of the bunched electrons with the acoustic wave, power is delivered to the wave thereby amplifying it. On the other hand, the electron traps reduce the gain delivered to the traveling wave by reducing the number of mobile electrons present for conduction. Thus, if the electron traps are made "dynamic" with a finite relaxation time in the range of $10^{-8}$ to $10^{-10}$ seconds, the device is made to selectively amplify and selectively attenuate particular frequencies of the applied acoustic wave.

To determine the frequencies which are amplified and which are attenuated, consider a crystal in which a fraction, $f$, of the total space charge, $n$, is free to move. The rate at which the trapping population adjusts to local perturbations in the crystal due to the acoustic wave is identified as the inverse of a relaxation time, $\tau$. Then, when dynamic trapping effects are present, the product of $\omega\tau$, where equals the frequency of an applied wave in radians, defines a drift velocity, $V_d$, at which attenuation is zero. With dynamic trapping effects at some drift velocity, $V_d$, there will be low frequency acoustic wave attenuation and high frequency acoustic wave amplification.

In the case CdS suitable trapping centers are found to have depth of about 0.4 ev. below the conduction band. These traps can be introduced in specific ways including the radiation at $\lambda<0.8\mu$, 300° K. and excess sulfur doping.

As previously mentioned, dynamic trapping affects the low frequency gain through a piezoelectric crystal where the relaxation time is greater than the period of the applied wave. At high frequencies, electron diffusion tends to smooth out the electron distribution, thereby reducing the high frequency gain. If the wavelength of the acoustic wave is smaller than a quantity known as the "screening length," diffusion effects are of importance. If the wavelength of the applied acoustic wave is less than the "screening length," electron bunching is reduced and since gain is also related to the degree of electron bunching, when bunching is reduced, gain is likewise reduced.

Figure 3:
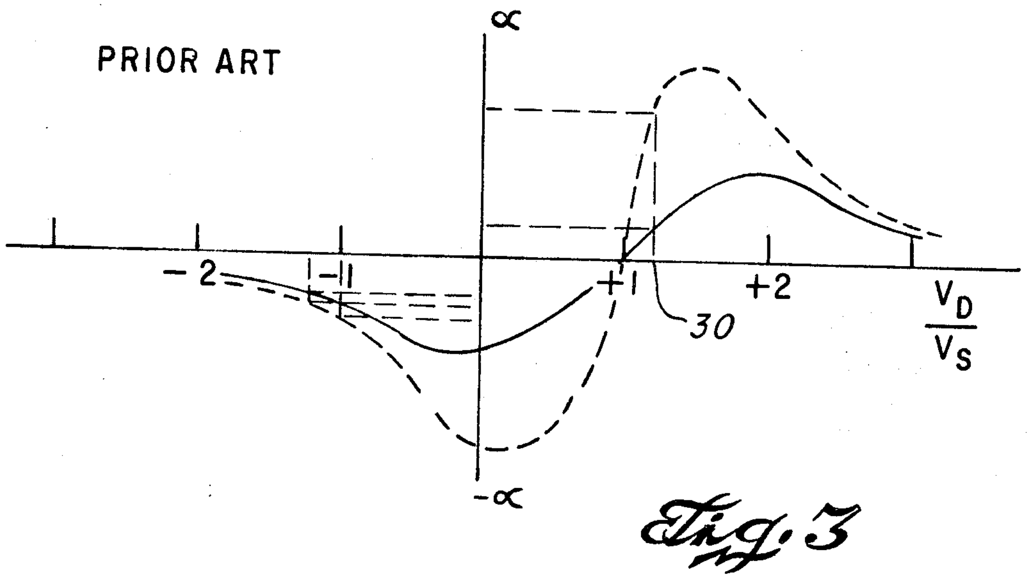
FIG. 3 is a series of curves illustrating the electrical characteristics of two stage devices of the prior art.

The curves illustrating the electrical characteristics of the two-stage devices of the prior art are shown in FIG. 3. Plotted on the absissa axis is $V_D/V_S$, the ratio of the velocity of electron drift in the crystal to the velocity of the sound wave in the crystal. Plotted on the ordinate axis is $\alpha$ the gain. From the graph it can be seen that at the point at which the ratio $V_D/V_S$ becomes more than +1, the device changes from an attenuator (seen as negative gain on the graph) to an amplifier (seen as positive gain). Typically, the first, or amplifying portion of the crystal is operated at point 30 on the $V_D/V_S$ axis to amplify the signal in the forward direction and to attenuate in the reverse direction. The reverse direction, as herein used, denotes a direction of the crystal, which is represented by the $-V_D/V_S$ direction. It will be appreciated of course, that the amounts of amplification and attenuation vary for differential signal frequencies, and, as above mentioned if the net reverse loss is less than the net forward gain, the device is unstable at certain frequencies (in the absence of a second stage). Normally, the second portion of the prior art device is operated at the point where $V_D/V_S$ is equal to 1. Thus, in the second stage there is no gain or loss in the forward direction, and there is presented some loss at all frequencies in the reverse direction. The purpose of this second stage, of course, is to ensure that the net forward gain never exceeds the reverse loss at any frequency, so the device will be stable.

Figure 4:
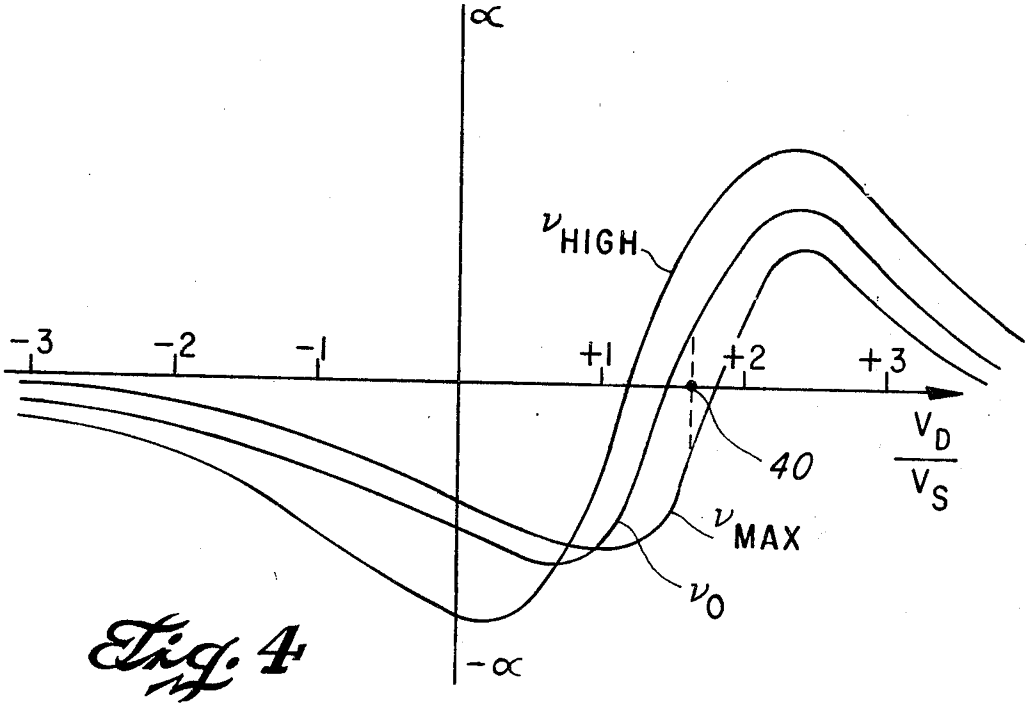
FIG. 4 is a series of curves illustrating the electrical characteristics of the second stage of the device of the invention to show the results of dynamic trapping and to contrast the characteristics of the invention to the aligned characteristics of the prior art shown in FIG. 3.

In contrast, the electrical characteristics of the second stage of the device of the invention are shown in FIG. 4. In the device of the invention, the first stage operates essentially in the same manner as the first stage in the above-described prior art device, and the prior art curves are applied in its analysis. Since the first stage, is operated just as the first stage in the prior art, a suitable operated point may be point 30 in FIG. 3. Because of the dynamic traps present in the second stage the curves of FIG. 4 must be used to analyze the second stage. The presence of the dynamic traps cause the curves to be shifted to the right from those of the prior art. The curve denoted $\gamma_{MAX}$ represents the amplification characteristics of the second region at the frequency of maximum amplification of the first region; the curve denoted $\gamma_0$ represents the amplification characteristics of the second region at the desired operating frequency of the entire device; and the curve denoted by $\gamma_{HIGH}$ represents the amplification characteristics of the second region at some frequency higher than the operating frequency, $\gamma_0$. The desirable operating point for the second stage is at point 40 on the $V_d/V_s$ axis. Point 40 is in between the curves of $\gamma_{MAX}$ and $\gamma_0$ so that the signals at and above the operating point 40, including signals of frequency, $\gamma_0$, are amplified by the second stage and frequencies below the operating point 40, including signals of frequency such as $\gamma_{MAX}$, are attenuated. Thus, the device is designed to operate as a high-pass filter and amplifier with a cut-off frequency somewhere between $\gamma_0$ and $\gamma_{MAX}$, as defined by the operating point 40 of the second region.

The high frequency signals, as above mentioned, are attenuated by thermal energy and other naturally occurring dispersion phenomena, so, in effect, the device acts as a band-pass filter and amplifier, attenuating both high and low frequency signals and amplifying the desired signal band.

Figure 5:
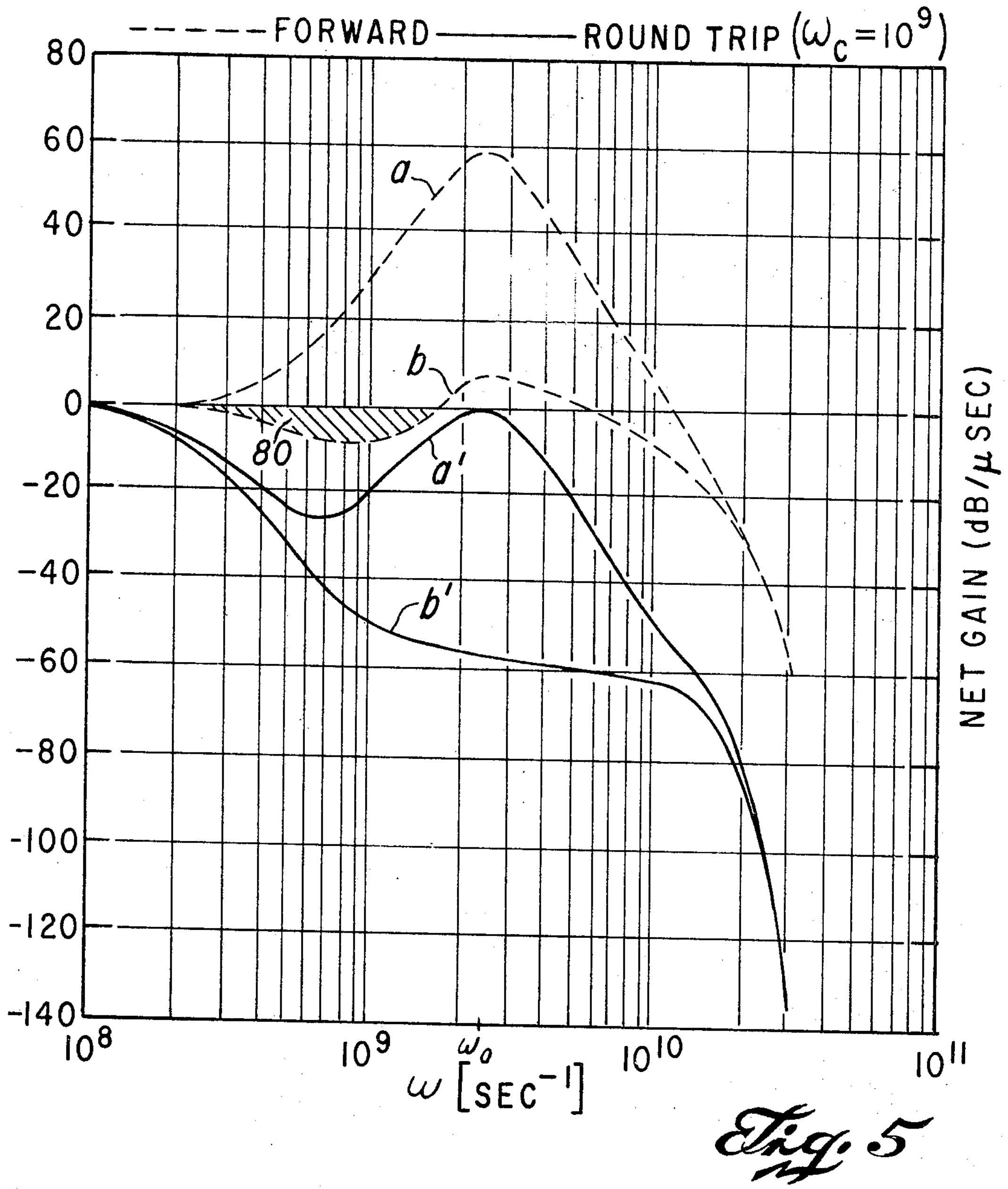
FIG. 5 is a series of curves showing amplification and attenuation of an applied wave through the various regions of the device of FIG. 1.

Referring now to FIG. 5, there is shown a graph of the forward and round trip gains (in db/$\mu$ second) of an ultrasonic wave in a CdS crystal, as shown in FIG. 1, as a function of frequency. The dotted lines represent the net gain of the device in the forward direction only, and the continuous lines represent the gain of the device in the forward and reverse directions. Again, negative gain represents attenuation. The absissa represents angular frequency, the relaxation frequency, $\omega_c$, of the dynamic traps being denoted as $10^9$ radians per second, and the operating frequency, $\omega_0$, being denoted as $2.5\times10^9$ radians per second. For the crystal of FIG. 1, the parameters of the *first region* 12 are adjusted to effect a net forward gain and net reverse attenuation corresponding to curves *a* and *a'*, respectively. In this region, high amplification of the applied acoustic wave results with almost no round trip attenuation of unwanted signals in a bandwidth about the frequency, $\omega_0$, of the applied wave. The parameters of the *second region* 13 are adjusted such that amplification and attenuation correspond to curves *b* and *b'*, respectively. In this section, very little, if any amplification of the applied wave results but there is a high reverse wave attenuation, with round trip attenuation on the order of about 60 db for a wide frequency bandwidth. Additionally, at frequencies slightly less than the operating frequency, $\omega_0$, dynamic trapping effects, shown by the shaded dip 80 in curve *b*, attenuate lower frequency components of the applied wave in the forward direction.

Figure 6:
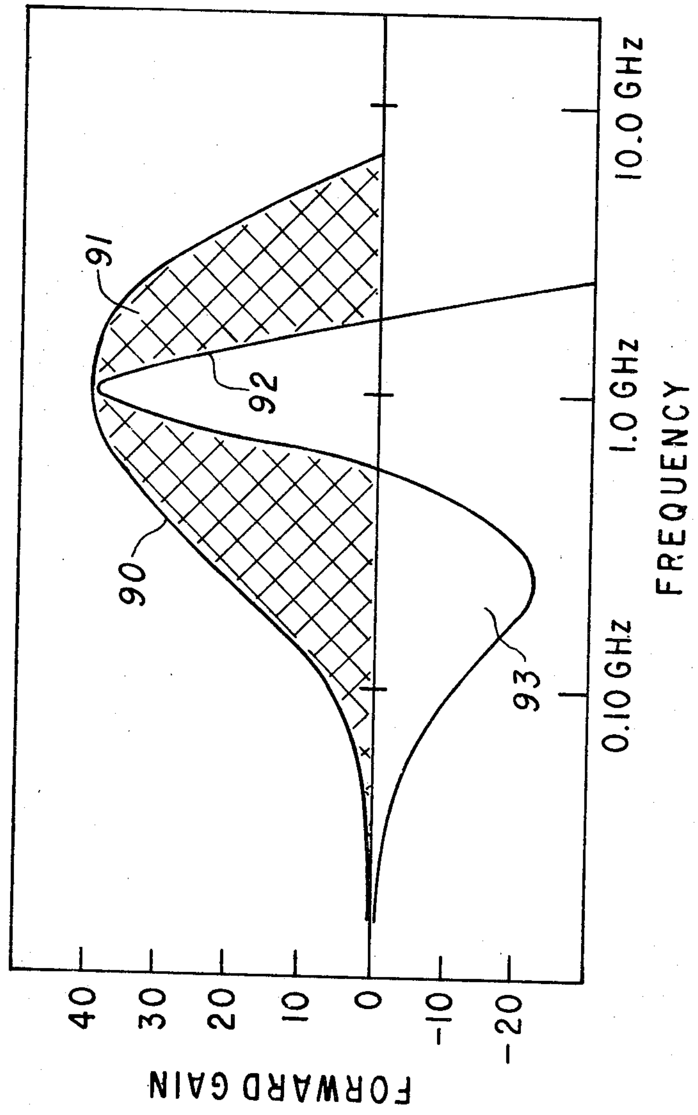
FIG. 6 is a comparison of the forward amplification characteristics of the prior art devices with the forward characteristics of the present invention, for 40 db center frequency gain at 1 gHz.

The performance of the prior art two stage devices is compared with the present invention in FIG. 6, a plot of the net forward gain as a function of frequency for the few devices at 1 gHz. for 40 db of maximum gain. The curve, 90, represents the forward characteristics of the prior art devices, and the curve 92 shows the characteristics for the present invention. The shaded area 91 gives a qualitative description of the improved noise rejection of the present invention, and the area 93 shows the forward attenuation presented by the device of the invention in addition to the greatly improved noise rejection as above described. It can be readily appreciated from the curves of FIG. 6 that not only is there an improvement in the noise equivalent bandwidth, but the strong nonlinear interactions with harmonics and subharmonics which occurs in previously used devices and which limit broad band acoustic amplifier gain are avoided.

EXAMPLE 1

The design criteria for the device described in FIG. 6 are as follows:

Region 1: the ratio of $(V_D/V_S)=1.10$ ($\sigma=1.09\times10^4$ ohm-cm.)

Region 2: the ratio of $(V_D/V_S)=1.01$ ($\sigma=1.0\times10^4$ ohm-cm.

$\omega_{c1}=1.09\times10^8$ radians/sec. (center frequency of first stage)

$\omega_{c2}=1.0\times10^8$ radians/sec. (center frequency of second stage)

For simplicity the entire crystal is doped to achieve a ratio of free to total space charge of 0.8 using the previously mentioned trapping centers which result in a relaxation time of about $10^{-9}$ sec.

The desired lengths of the two regions $l_1$ and $l_2$ are determined by the net gain for the amplifier frequency, and the amount of attenuation desired for the sub-harmonics. For 40 db net gain at 1 gHz. the sub-harmonics must be attenuated in Region 2 exactly as much as they are amplified in Region 1. This is a more stringent requirement than would be needed in practice. The power dissipation for this case is $$\frac{114.8\text{ milliwatt}}{(\text{mm.})^2\text{ db}}$$

May (Proc. IEEE, 53, 1465 (1965)) has calculated the optimum conditions for the ideal 1 stage ClS amplifier operating at 2.04 kv. and 0.808 ma. His results for 1 gHz. can be compared with the two stage amplifier of the present invention, assuming a cross-sectional area of 0.36 $(\text{mm.})^2$. May found that 3.78 watts are required for 40 db gain; however, the amplifier of the present invention requires only 1.65 watts for the 40 db gain, and this calculation is not even for an optimized case. Thus, it is clear that this invention will not only attack the harmonic noise problem but will also result in a lower operating power requirement.

In principle, the design concepts of the invention, as illustrated above, can be extended over a wide range of frequencies. One of the most important features of the invention is the elimination of sub-harmonic and harmonic buildup, since this type of noise results in nonlinear interactions with the signal. For continuous wave operation the invention utilizes the most favorable field distribution to avoid current oscillation and acoustic oscillation.

Figure 7:
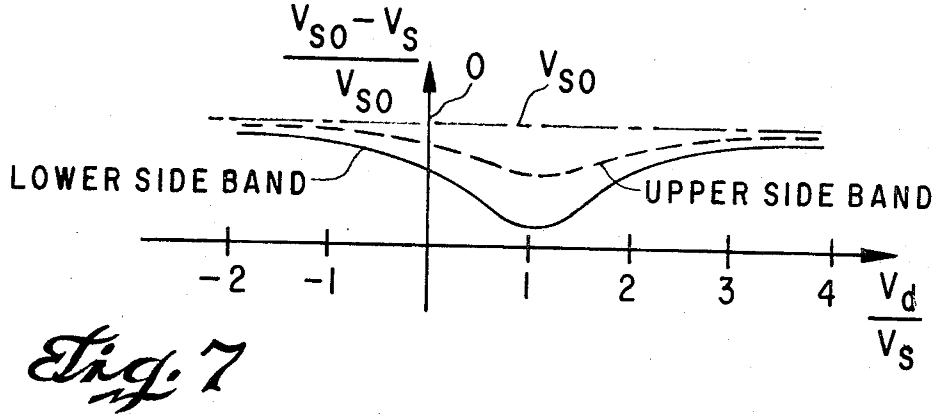
FIG. 7 is a series of curves showing the phase shift of an applied wave to the ratio of drift velocity to the velocity of sound in the crystal for the amplifier of FIG. 1.

Another important consideration in the design of the invention is the amount of phase shift tolerable between the upper and lower side band frequencies of the applied wave to be amplified. The phase shift in a crystal is directly proportional to the velocity of sound ($V_S$) in the amplifier crystal, which, of course, varies with frequency and with the applied electric field. In FIG. 7 there is shown curves of the percentage of change in sound velocity from $V_{SO}$ ($V_{SO}$ being defined as the unperturbed sound velocity through an insulating crystal, having no external influences applied, such as a D.C. field, or light waves) versus the ratio of the drift velocity to the velocity of sound. The straight line curve represents $V_{SO}$, the piezoelectrically "stiffened" sound velocity in an insulating piezoelectric compound, and indicates a condition where no phase change occurs across a finite bandwidth for waves propagating through a crystal. The lower curve of FIG. 7 represents a phase change of the lower side band frequency of a propagating wave, the the middle curve represents a phase change of the upper side band frequency.

Figure 8:
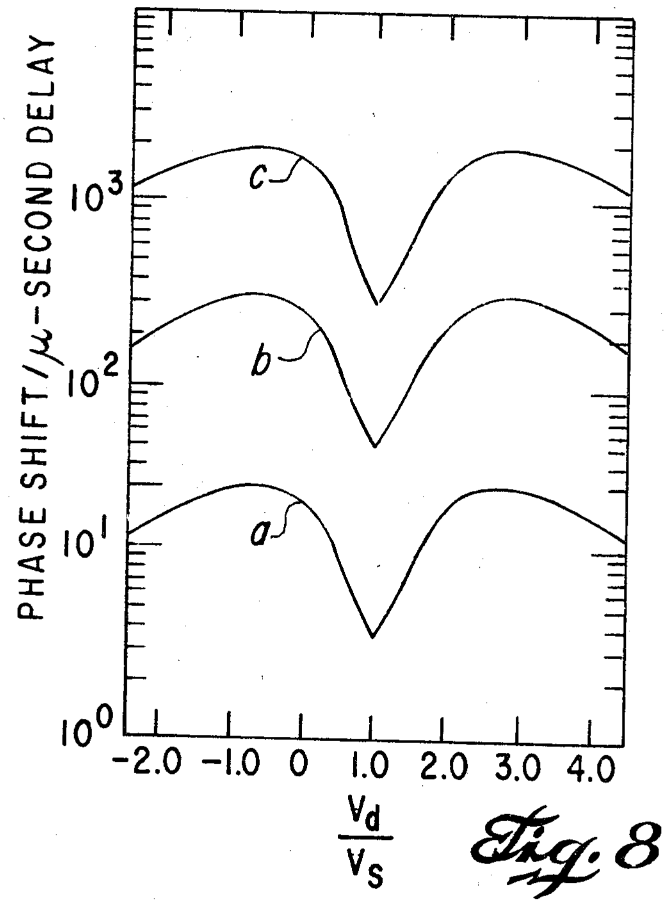
FIG. 8 is a series of curves showing phase shift through a piezoelectric crystal per microsecond delay.

Referring now to FIG. 8, there is shown a graph of relative phase shift per microsecond delay versus the ratio of drift velocity to the velocity of sound. The left vertical axis indicates degrees phase shift for ultrasonic waves in cadmium sulfide (CdS). The three curves shown are for bandwidths of 10 mHz. (curve *a*), 100 mHz. (curve *b*), and 500 mHz. (curve *c*) at a center frequency of 1.0 gHz.

Figure 9:
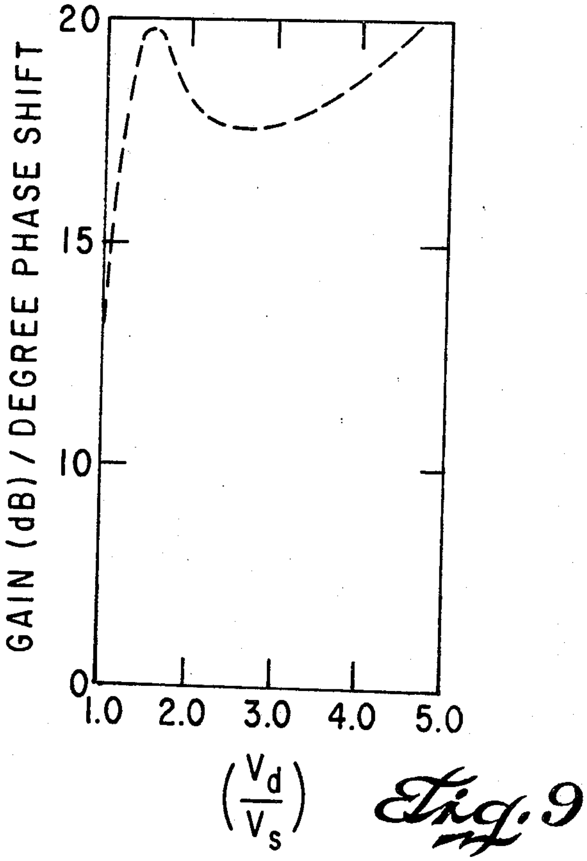
FIG. 9 is a plot of gain per degree phase shift versus the ratio of drift velocity to the velocity of sound.

The relationship between gain and phase can be seen from the graph of FIG. 9, a plot of gain per unit phase shift versus the ratio $V_D/V_S$ for an applied ultrasonic wave with a center frequency of 1.0 gHz. and a bandwidth of 10 mHz. The gain per unit phase shift reaches a maximum at a velocity ratio of about 1.6; thus, by appropriate doping with dynamic traps and by properly biasing the device, an optimum operating condition for minimum phase shift can be achieved under low power conditions. Because of the phase shift, in the design of the regions 12 and 13 of the crystal 10, a compromise may have to be made between the amount of desired gain and the amount of tolerable phase shift. Alternatively, the dispersion accompanying the gain can be utilized to produce a large phase shift with the amplification being used to simply reduce insertion loss and the device can then be used as a phase shifter.

As mentioned previously, the two-stage device of this invention also finds application as a delay line, and since this is an active delay line, amplification of the applied signal is also possible. The above-described curves of FIG. 7 show the amount of delay possible within tolerable limits of phase shift.

Figure 10:
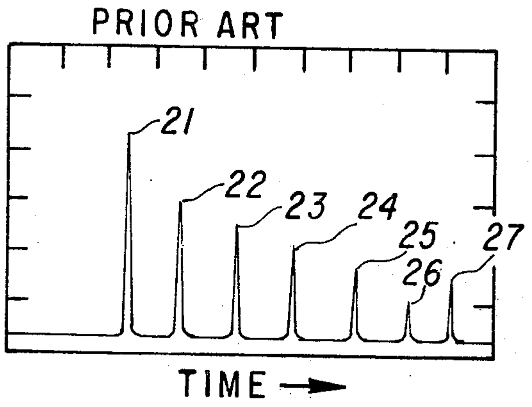
FIG. 10 is a graph showing echoes of an applied wave having a frequency $\omega_0$ appearing at the output of a piezoelectrical crystal amplifier operating above curve $a'$ of FIG. 5.
Figure 11:
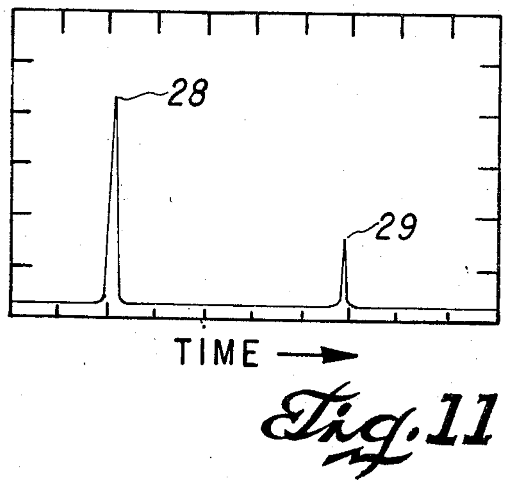
FIG. 11 is a graph showing the output pulse of a piezoelectric amplifier having an input signal at frequency $\omega_0$ and operating along curve $c'$ of FIG. 5.

By way of comparison, FIG. 10 shows the echo signals at the output transducer of a piezoelectric amplifier with an applied pulse signal at $\omega_0$ operating along curve $a'$ of FIG. 5, and FIG. 11 shows that such echoes are suppressed in the piezoelectric amplifier of FIGS. 1 and 2 when operating along curve $c'$ at a frequency of $\omega_0$, on the graph of FIG. 5. The six pulses 21–26 nhown in FIG. 9 are the first six round trip signals at the output transducer for a pulse input wave in a piezoelectric crystal amplifier without round trip attenuation. Pulse 27 is a cut-off pulse. In FIG. 11, however, pulse 28 is the amplified input pulse at the output transducer of an amplifier under operating conditions of region 13, and pulse 29 is the cut-off pulse. Note, no echo pulses appear for the second stage of the piezoelectric crystal amplifier.

What is claimed is:

1. An ultrasonic wave amplifier comprising:
- a piezoelectric crystal having a first and second region;
- said first region having parameters for amplification of an applied ultrasonic wave;
- said second region, immediately following said first region, having parameters for approximately zero amplification of said applied ultrasonic wave; and
- shallow acceptor impurities located at least throughout said second region, said impurities having a relaxation period greater than the period of said applied ultrasonic wave, thereby attenuating ultrasonic waves of frequency less than the frequency of said applied ultrasonic wave.

2. An ultrasonic wave amplifier as claimed in claim 1 further including means for generating a D.C. electric field in said piezoelectric crystal.

3. An ultrasonic wave amplifier as claimed in claim 1 further including means for illuminating said crystal to control the electron drift characteristics of said crystal.

4. An ultrasonic wave amplifier as claimed in claim 1 wherein said piezoelectric crystal is cadmium sulfide (CdS).

5. The ultrasonic wave amplifier as claimed in claim 1 wherein said relaxation period is between $2\pi\times10^{-8}$ to $6\pi\times10^{-11}$ seconds.

6. An ultrasonic wave amplifier comprising:
- a piezoelectric crystal having first and second regions:
- said first region having parameters for amplification of an applied ultrasonic wave;
- said second region, immediately following said first region, having parameters for approximately zero amplification of said applied ultrasonic wave;
- shallow impurity ions located at least throughout said second region and having a relaxation period greater than the period of said applied ultrasonic wave, thereby attenuating ultrasonic waves in said crystal at frequencies less than the frequency of said applied wave;
- a first transducer formed upon said first region of said piezoelectric crystal for converting a high frequency electrical signal into an acoustic wave;
- a second transducer formed on said second region at the opposite end of said piezoelectric crystal from said first transducer for converting an acoustic wave into a high frequency electrical signal; and
- means for establishing an electric field across said piezoelectric crystal.

7. The acoustic amplifier as claimed in claim 6 wherein said piezoelectric crystal in said first and second transducers are a monolithic structure in which said transducers are conductive layers fused into opposite ends of said structure.

8. An acoustic amplifier as set forth in claim 6 wherein said piezoelectric crystal is a semiconductor taken from Group II–VI of the Periodic Table.

9. The ultrasonic wave amplifier as claimed in claim 6 wherein said relaxation period is between $2\pi\times10^{-8}$ to $6\pi\times10^{-11}$ seconds.

10. A two-stage ultrasonic wave delay line comprising:
- a piezoelectric crystal having first and second regions;
- said first region having parameters for developing a first phase shift between the upper and lower side band frequencies of an applied wave with little if any amplification;
- said second region immediately following said first region having parameters for developing a second stage shift between said upper and lower side band frequencies of said applied ultrasonic wave; and
- shallow impurity ions located throughout at least said second region of said crystal and having a relaxation period greater than the period of said applied wave, thereby to achieve said parameters and to attenuate noise and waves reflected through said crystal at a frequency lower than the frequency of the applied ultrasonic wave.

11. The ultrasonic delay line as claimed in claim 10 including means for generating a D.C. electric field in said crystal.

12. An ultrasonic delay line as claimed in claim 11 including means for varying said D.C. electric field to vary the stage shift developed between the upper and lower side band frequencies of said applied wave.

13. The ultrasonic wave amplifier as claimed in claim 10 wherein said relaxation period is between $2\pi\times10^{-8}$ to $6\pi\times10^{-11}$ seconds.

14. An acoustic wave amplifier comprising:
- a piezoelectric crystal having defined thereof first and second regions;
- said first region having parameters for maximum amplification of a signal of frequency just below the frequency of the applied acoustic wave;
- said second region, immediately following said first region, having parameters for achieving a drift velocity to velocity of sound ratio at which a wave of frequency intermediate the frequency of maximum amplification in said first region and the frequency of said applied ultrasonic wave is neither amplified or attenuated;
- shallow acceptor impurities located at least throughout said second region having a relaxation period greater than the period of the applied acoustic wave to present dynamic traps to attenuate acoustic waves of frequency less said frequency which is neither amplified nor attenuated in said second region.

15. The acoustic wave amplifier as claimed in claim 14 wherein the relaxation period for said shallow acceptor impurities is between $10^{-8}$ to $10^{-11}$ second, thereby amplifying only a narrow band about an applied acoustic wave of outer frequency about $2.6\times10^{9}$ radians per second.

16. An acoustic wave phase shifter comprising:
- a piezoelectric crystal having defined thereof first and second regions;
- said first region having parameters for maximum amplification of a signal of frequency just below the frequency of the applied acoustic wave;
- said second region, immediately following said first region, having parameters for achieving a drift velocity to velocity of sound ratio at which a wave of frequency intermediate the frequency of maximum amplification in said first region and the frequency of said applied ultrasonic wave is neither amplified or attenuated;
- shallow acceptor impurities located at least throughout said second region having a relaxation period greater than the period of the applied acoustic wave to present dynamic traps to attenuate acoustic waves of frequency less said frequency which is neither amplified nor attenuated in said second region.

17. In the method for amplifying an acoustic wave applied to a piezoelectric crystal having a D.C. electric field established therein and having two regions, the first region amplifying the applied acoustic signal and the second region isolating reflections from the end of the crystal from said first region, the improvement comprising introducing shallow acceptor impurities into said second region to present dynamic electron traps to said applied wave, and operating said second region in an area of net negative gain to signals of frequency below a frequency slightly less than that of the applied acoustic wave.

No references cited.

ROY LAKE, Primary Examiner

D. R. HOSTETTER, Assistant Examiner

U.S. Cl. X.R.

333—30, 81